United States Patent [19]

Mennemann et al.

[11] 4,390,638

[45] Jun. 28, 1983

[54] ACIDPROOF, HYDROLYSIS-RESISTANT OPTICAL AND OPHTHALMIC GLASS OF LOW DENSITY

[75] Inventors: Karl Mennemann, Taunusstein; Georg Gliemeroth; Volkmar Geiler, both of Mainz-Finthen, all of Fed. Rep. of Germany

[73] Assignee: Schott Glaswerke, Mainz, Fed. Rep. of Germany

[21] Appl. No.: 282,787

[22] Filed: Jul. 13, 1981

[30] Foreign Application Priority Data

Jul. 14, 1980 [DE] Fed. Rep. of Germany ....... 3026605

[51] Int. Cl.³ .......................... C03C 3/08; C03C 3/10
[52] U.S. Cl. ...................... 501/77; 501/75; 501/76; 501/78; 501/79; 501/901; 501/903
[58] Field of Search .................. 501/77, 78, 79, 901, 501/903, 75, 76

[56] References Cited

U.S. PATENT DOCUMENTS

| | | | |
|---|---|---|---|
| 3,877,953 | 4/1975 | Broemer et al. | 501/903 |
| 3,898,093 | 8/1975 | Faulstich et al. | 106/54 |
| 4,055,435 | 10/1977 | Sagara | 106/52 |
| 4,057,435 | 11/1977 | Boudot et al. | 106/47 |
| 4,084,978 | 4/1978 | Sagara | 501/903 |
| 4,194,916 | 3/1980 | Kumata et al. | 106/47 |

FOREIGN PATENT DOCUMENTS

2809409 9/1978 Fed. Rep. of Germany .
1591210 6/1981 United Kingdom .

*Primary Examiner*—Mark Bell
*Attorney, Agent, or Firm*—Millen & White

[57] ABSTRACT

An optical and ophthalmic glass having an index of refraction of $\geq 1.69$, an Abbe number of $\geq 37$, and a density of $\leq 3.30$ g/cm$^3$, consists essentially of (in % by weight):

| | |
|---|---|
| $SiO_2$ | 18–36 |
| $B_2O_3$ | 3–18 |
| $GeO_2$ | 0–8 |
| $Al_2O_3$ | 0–6, |
| wherein $SiO_2 + B_2O_3 + Al_2O_3 + GeO_2 =$ | 25–39 |
| $P_2O_5$ | 0–14, |
| wherein $SiO_2 + B_2O_3 + Al_2O_3 + GeO_2 + P_2O_5 =$ | 30–44 |
| $Li_2O$ | 0–12 |
| $Na_2O$ | 0–14 |
| $K_2O$ | 0–18 |
| $Li_2O + Na_2O + K_2O =$ | 2–18 |
| MgO | 0–15 |
| CaO | 7–25 |
| MgO + CaO | 15–32 |
| SrO | 0–13 |
| BaO | 0–17 |
| ZnO | 0–15 |
| PbO | 0–10 |
| SrO + BaO + ZnO + PbO | 0–20 |
| $TiO_2$ | 3–14 |
| $Nb_2O_5$ | 0–13 |
| $WO_3$ | 0–10 |
| $TiO_2 + Nb_2O_5 + WO_3 =$ | 10–21 |
| $ZrO_2$ | 0–15, |
| $La_2O_3$ | 0–20 |
| $Y_2O_3$ | 0–16 |
| $Gd_2O_3$ | 0–16 |
| $Yb_2O_3$ | 0–10 |
| $La_2O_3 + Y_2O_3 + Gd_2O_3 + Yb_2O_3 =$ | 0–20 |
| $Ta_2O_5$ | 0–13 |
| $HfO_2$ | 0–5 |
| $SnO_2$ | 0–6. |

14 Claims, No Drawings

ACIDPROOF, HYDROLYSIS-RESISTANT OPTICAL AND OPHTHALMIC GLASS OF LOW DENSITY

BACKGROUND OF THE INVENTION

The present invention relates to a lightweight, acidproof, hydrolysis-resistant optical and ophthalmic glass having an index of refraction $n_d \geq 1.69$, an Abbe number $v_d \geq 37$, and a density $s \leq 3.30$ g/cm$^3$. It is a borosilicate glass in the system $SiO_2$-$B_2O_3$-$CaO$-$TiO_2$.

Lightweight glasses of a high refractive index, for example for ophthalmic optics or for optical systems have been described in DAS [German Published Application] No. 2,259,183. These glasses, having a density of about 3.0 g/cm$^3$, are especially well suited for strong corrections, but exhibit the grave disadvantage of strong dispersion, i.e., they have a comparatively low Abbe number $\leq 33$. This strong dispersion causes a person wearing glasses of this type to see pronounced color fringes. For this reason, attempts have been made to improve their dispersion while retaining the same or only a slightly increased specific density (French Pat. No. 2,427,309). These new glasses, however, also fail to meet the requirements for a $v_d$ value $\geq 37$ which generally would be highly desirable.

In further developments, glasses were provided having an increased Abbe number; however, they cannot be manufactured continuously due to their instability toward crystallization. In addition, their chemical resistance (acidproofness and resistance to climatic changes) do not satisfy the requirements imposed on spectacle lenses. Glasses of this type are described in DOS [German Unexamined Laid-Open Application] No. 2,809,409 and DAS No. 2,715,894, as well as DAS No. 2,623,683.

Accordingly, it is an object of the present invention to provide a new optical and ophthalmic glass which meets the aforementioned requirements and avoids the aforementioned disadvantages.

Upon further study of the specification and appended claims, further objects and advantages of this invention will become apparent to those skilled in the art.

These objects have been attained by providing an optical and ophthalmic glass having an index of refraction of $\geq 1.69$, (e.g., 1.69-1.71), an Abbe number of $\geq 37$, (e.g., 37-43) and a density of $\leq 3.30$ g/cm$^3$, (e.g., 3.30-3.10), comprising (in % by weight):

|  | General Range | Preferred Range, When Included |
|---|---|---|
| $SiO_2$ | 18-36 | 18-36 |
| $B_2O_3$ | 3-18 | 3-18 |
| $GeO_2$ | 0-8 | 0-8 |
| $Al_2O_3$ | 0-6, | 0-6 |
| wherein $SiO_2 + B_2O_3 + Al_2O_3 + GeO_2 = 25-39$ | | |
| $P_2O_5$ | 0-14, | 0.5-4 |
| wherein $SiO_2 + B_2O_3 + Al_2O_3 + GeO_2 + P_2O_5 = 30-44$ | | |
| $Li_2O$ | 0-12 | 0-12 |
| $Na_2O$ | 0-14 | 0-14 |
| $K_2O$ | 0-18 | 0-18 |
| $Li_2O + Na_2O + K_2O = 2-18$ | | 2-18 |
| $MgO$ | 0-15 | 0-15 |
| $CaO$ | 7-25 | 7-25 |
| $MgO + CaO$ | 15-32 | 15-32 |
| $SrO$ | 0-13 | 0-13 |
| $BaO$ | 0-17 | 0-17 |
| $ZnO$ | 0-15 | 0-15 |
| $PbO$ | 0-10 | 0-10 |
| $SrO + BaO + ZnO + PbO$ 0-20 | | |
| $TiO_2$ | 3-14 | 3-14 |
| $Nb_2O_5$ | 0-13 | 0-13 |
| $WO_3$ | 0-10 | 0-10 |
| $TiO_2 + Nb_2O_5 + WO_3 = 10-21$ | | |
| $ZrO_2$ | 0-15, | 3-8 |
| $La_2O_3$ | 0-20 | 3-12 |
| $Y_2O_3$ | 0-16 | 0-16 |
| $Gd_2O_3$ | 0-16 | 0-16 |
| $Yb_2O_3$ | 0-10 | 0-10 |
| $La_2O_3 + Y_2O_3 + Gd_2O_3 + Yb_2O_3 = 0$-$20$ | | 3-12 |
| $Ta_2O_5$ | 0-13 | 0-13 |
| $HfO_2$ | 0-5 | 0-5 |
| $SnO_2$ | 0-6. | 0-6 |

A particularly preferred such glass has a $v_d$ value of $\geq 39$ and a density s of $\leq 3.2$ g/cm$^3$, is sufficiently stable with respect to crystallization to permit continuous manufacture and simultaneously satisfies the minimum requirements for acid resistance and resistance against climatic changes, and comprises (% by weight):

| | |
|---|---|
| $B_2O_3$ | 5-14 |
| $SiO_2$ | 24-32 |
| $Al_2O_3$ | 0-6 |
| $GeO_2$ | 0-8 |
| $B_2O_3 + SiO_2 + Al_2O_3 + GeO_2 = 33-39$ | |
| $P_2O_5$ | 0-6 |
| $B_2O_3 + SiO_2 + Al_2O_3 + GeO_2 + P_2O_5 = 37-43$ | |
| $Li_2O$ | 0-7 |
| $Na_2O$ | 0-8 |
| $K_2O$ | 0-11 |
| $Li_2O + Na_2O + K_2O = 4-14$ | |
| $MgO$ | 0-10 |
| $CaO$ | 12-25 |
| $MgO + CaO = 18-27$ | |
| $ZnO$ | 0-8 |
| $BaO$ | 0-6 |
| $SrO$ | 0-6 |
| $PbO$ | 0-5 |
| $ZnO + BaO + SrO + PbO = 0-8$ | |
| $TiO_2$ | 6-10 |
| $Nb_2O_5$ | 0-8 |
| $WO_3$ | 0-10 |
| $TiO_2 + Nb_2O_5 + WO_3 = 13-19$ | |
| $ZrO_2$ | 3-9 |
| $La_2O_3$ | 0-11 |
| $Y_2O_3$ | 0-12 |
| $Gd_2O_3$ | 0-8 |
| $Yb_2O_3$ | 0-7 |
| $La_2O_3 + Y_2O_3 + Gd_2O_3 + Yb_2O_3 = 0-14$ | |
| $Ta_2O_5$ | 0-7 |
| $HfO_2$ | 0-6 |
| $SnO_2$ | 0-6 |

DETAILED DISCUSSION

The present invention makes it possible to continuously produce spectacle glass and optical glasses with adequate chemical resistance (e.g., acidproofness and water resistance), with an index of refraction of about 1.7 and an Abbe number $\geq 37$, at a density of $\leq 3.30$ g/cm$^3$; at the same time, fusion with commercial spectacle crown glass can be ensured by setting its expansion coefficient $\alpha(20$-$300) \cdot 10^{-7}$ at 90-98, e.g., by conventional selection of suitable amounts of the following ingredients: $Na_2O$, $K_2O$, $Li_2O$.

According to this invention, a borosilicate glass is chosen as the basic glass system. As is known, this particular one has an excellently high chemical resistance. This basic glass system is combined with components increasing the refractive index, primarily, the light alkaline earth metal oxides MgO and CaO, especially CaO, and with components greatly raising the index of refraction while not impairing the Abbe number too extensively, i.e., $Nb_2O_5$ and $TiO_2$ as well as $ZrO_2$. In order to stabilize this system against reseparation, an addition of alkali metal oxide is necessary.

It has been found that this system, which is only moderately stable with respect to devitrification and which also exhibits insufficient chemical resistance due to its high content of alkaline earth metal oxides as well as alkali metal oxides, can be improved with regard to both aforementioned properties—devitrification stability and chemical resistance—if $P_2O_5$ is added thereto.

The glass according to this invention is made up of the following components in the recited ranges (in % by weight):

| | |
|---|---|
| $SiO_2$ | 18–36 |
| $B_2O_3$ | 3–18 |
| $GeO_2$ | 0–8 |
| $Al_2O_3$ | 0–6 | wherein the sum total of these tri- and tetravalent vitrifying agents amounts to 25–39% by weight.

As indicated above, the devitrification stability can be improved, along with the chemical resistance, by adding the pentavalent vitrifying agent $P_2O_5$; for this reason, an addition of a few percent of $P_2O_5$ is useful. An addition of >14%, however, renders the glass unstable against devitrification. Preferred is 0.5–4.0% of $P_2O_5$. The sum total of the tri- and tetravalent vitrifying agents plus $P_2O_5$ amounts to 30–44% by weight.

As mentioned, the addition of an alkali metal is required to prevent demixing. This can be achieved by the following additions:

| | % by Weight |
|---|---|
| $Li_2O$ | 0–12 |
| $Na_2O$ | 0–14 |
| $K_2O$ | 0–18 |
| $Li_2O + Na_2O + K_2O =$ | 2–18 |

If the proportion of alkali metal oxides >18%, devitrification stability and chemical resistance are negatively affected.

CaO is added as an essential component. It achieves a marked rise in the index of refraction, while ensuring a high Abbe number and simultaneously maintaining a low density. The function of the CaO can also be coachieved per the following by MgO within relatively wide limits. The proportions of the light alkaline earth metal oxides MgO and CaO are:

| | % by Weight |
|---|---|
| MgO | 0–15 |
| CaO | 7–25 |
| MgO + CaO = | 15–32 |

From the heavy alkaline earth metal oxides SrO and BaO, the following proportions can be added, if necessary, e.g., in order to adjust the density:

| | |
|---|---|
| SrO | 0–13% by weight |

-continued

| | |
|---|---|
| BaO | 0–17% by weight; | furthermore permissible are:

| | |
|---|---|
| ZnO | 0–15% by weight |
| PbO | 0–10% by weight, | with the condition: $SrO+BaO+ZnO+PbO \leq 20\%$, since the density increases greatly at larger proportions.

Another absolutely necessary component of the glass of this invention is $TiO_2$ since, as is known, the index of refraction is thereby greatly raised while the density increases by only a small amount. An addition of 3–14% by weight is required to raise the index of refraction to the desired value of >1.69. Another positive property added by $TiO_2$ is an improvement in chemical resistance.

Similar effects as for $TiO_2$ are exhibited by $Nb_2O_5$ and $WO_3$. These oxides can be added in amounts of

| | |
|---|---|
| $Nb_2O_5$ | 0–13% by weight |
| $WO_3$ | 0–10% by weight |

The sum total of these three oxides $TiO_2$, $Nb_2O_5$, $WO_3$, similar in properties, is 10–21% by weight.

Another usable oxide is $ZrO_2$. This compound greatly increases the index of refraction, but reduces the Abbe number only moderately, while improving the chemical resistance to a marked extent. This oxide can be added in proportions of 0–15% by weight; a proportion of 3–9% by weight is preferred.

To stabilize the glass further against devitrification, the following can be added per this invention:

| | |
|---|---|
| $La_2O_3$ | 0–20% by weight |
| $Y_2O_3$ | 0–16% by weight |
| $Gd_2O_3$ | 0–16% by weight |
| $Yb_2O_3$ | 0–10% by weight |
| Total | 0–20% by weight |

Furthermore, an addition of 0–13% $Ta_2O_5$ is possible. $HfO_2$ can be added in amounts of 0–5% by weight, and also $SnO_2$ in 0–6% by weight. These ions are added for purposes of adjusting the index of refraction.

A portion of the oxygen ions (e.g., 0–1% by weight) can be replaced by fluoride ions by introducing a fluoride into the glass melt instead of an oxide. Fluoride ions may be added for the purpose of decreasing the melting temperature and stabilizing the glass against devitrification.

EXAMPLE OF A MELT
Glass batch charged for 220 Kg of glass

| | % by Weight | Raw Material | Weighed Quantity in kg |
|---|---|---|---|
| $B_2O_3$ | 11.25 | $H_3BO_3$ | 43.88 |
| $SiO_2$ | 24.00 | $SiO_2$ | 52.88 |
| $P_2O_5$ | 3.10 | $P_2O_5$ | 6.82 |
| $Li_2O$ | 0.70 | $Li_2CO_3$ | 3.85 |
| $Na_2O$ | 4.50 | $Na_2CO_3$ | 17.00 |
| $K_2O$ | 4.55 | $K_2CO_3$ | 14.70 |
| MgO | 2.90 | $MgCO_3$ | 15.08 |
| CaO | 16.30 | $CaCO_3$ | 63.26 |
| $La_2O_3$ | 6.60 | $La_2O_3$ | 14.55 |
| $TiO_2$ | 9.00 | $TiO_2$ | 19.82 |
| $ZrO_2$ | 1.65 | $ZrO_2$ | 3.65 |

-continued

EXAMPLE OF A MELT
Glass batch charged for 220 Kg of glass

| % by Weight | Raw Material | Weighed Quantity in kg |
|---|---|---|
| $Nb_2O_5$ 2.60 | $Nb_2O_5$ | 5.72 |
| $Ta_2O_5$ 12.85 | $Ta_2O_5$ | 28.30 |

The individual oxides can also be introduced in complex form, for example $P_2O_5$ bound to the alkali or alkaline earth oxides, e.g., as $CaPO_3$ or $Ca_2P_2O_7$. It is also possible, for example, to use $SiO_2$ in part as $CaSiO_3$ or, for example, as $ZrSiO_4$ with appropriate stoichiometric conversion. It is likewise feasible to introduce small amounts of a fluoride, e.g., as an alkali metal, alkaline earth metal, or rare earth fluoride. $As_2O_3$ or $Sb_2O_3$ is added to the batch as the refining agent (e.g., in amounts of 0.1–1% by weight); then the batch is mixed thoroughly and melted at approximately 1400° C. in a Pt crucible or a ceramic trough within about 8 hours. After a refining time of about 3 hours, the batch is stirred until the discharge or pouring temperature has been reached. The glass is conventionally either poured into casting molds or press-molded. The glass of this invention is particularly useful as spectacle glass requiring strong correction.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

TABLE
(Examples in % by Weight)

| | 1 | 2 | 3 | 4 | 5 | 6 | 7 |
|---|---|---|---|---|---|---|---|
| $B_2O_3$ | 3.20 | 17.75 | 9.10 | 9.50 | 12.95 | 10.25 | 9.80 |
| $SiO_2$ | 34.80 | 18.60 | 21.60 | 24.00 | 25.55 | 22.80 | 21.60 |
| $Al_2O_3$ | — | — | — | — | — | 5.10 | — |
| $GeO_2$ | — | — | — | — | — | — | — |
| $P_2O_5$ | — | 1.80 | — | 1.30 | 4.75 | — | 7.10 |
| $Li_2O$ | 2.07 | 1.15 | — | — | 9.15 | 1.45 | 1.10 |
| $Na_2O$ | 0.70 | 3.15 | — | 12.10 | — | 3.00 | 2.30 |
| $K_2O$ | 6.50 | 4.80 | 17.15 | — | — | 4.60 | 4.65 |
| MgO | 3.75 | 6.20 | 5.45 | 5.85 | 5.00 | 5.95 | 6.50 |
| CaO | 11.90 | 15.70 | 17.00 | 16.30 | 14.90 | 16.50 | 16.00 |
| SrO | — | — | — | — | — | — | — |
| BaO | — | — | — | — | 2.15 | — | — |
| ZnO | — | 2.05 | 1.85 | 2.00 | 2.25 | 2.00 | 2.00 |
| PbO | — | — | — | — | — | — | — |
| $La_2O_3$ | 19.88 | 7.50 | 7.30 | 7.90 | — | 8.00 | 8.10 |
| $Y_2O_3$ | — | — | — | — | — | — | — |
| $Gd_2O_3$ | — | — | — | — | — | — | — |
| $Y_2O_3$ | — | — | — | — | — | — | — |
| $TiO_2$ | 7.80 | 8.15 | 9.00 | 8.70 | 8.90 | 7.80 | 7.95 |
| $ZrO_2$ | 5.70 | 6.30 | 5.55 | 6.00 | 6.90 | 6.00 | 6.15 |
| $Nb_2O_5$ | 3.70 | 6.85 | 6.00 | 6.35 | 7.50 | 6.55 | 6.75 |
| $WO_3$ | — | — | — | — | — | — | — |
| $Ta_2O_5$ | — | — | — | — | — | — | — |
| nd | 1.6990 | 1.6982 | 1.6920 | 1.6943 | 1.7026 | 1.6977 | 1.6949 |
| νd | 40.5 | 39.5 | 38.6 | 38.5 | 39.9 | 39.2 | 39.3 |
| S | 3.30 | 3.14 | 3.12 | 3.16 | 3.02 | 3.15 | 3.17 |

| | 8 | 9 | 10 | 11 | 12 | 13 | 14 |
|---|---|---|---|---|---|---|---|
| $B_2O_3$ | 7.85 | 11.45 | 12.50 | 11.20 | 11.60 | 11.35 | 11.35 |
| $SiO_2$ | 29.50 | 25.80 | 25.80 | 25.00 | 26.00 | 26.15 | 25.40 |
| $Al_2O_3$ | — | — | — | — | — | — | — |
| $GeO_2$ | — | — | — | — | — | — | — |
| $P_2O_5$ | 1.45 | — | — | — | — | — | — |
| $Li_2O$ | 1.40 | 1.50 | 1.50 | 1.40 | 2.90 | — | 1.40 |
| $Na_2O$ | 2.90 | 3.10 | 3.10 | 2.90 | 3.00 | 5.90 | 3.00 |
| $K_2O$ | 4.40 | 4.75 | 4.70 | 4.40 | — | 4.50 | 4.50 |
| MgO | — | 14.25 | 0.50 | 5.70 | 5.90 | 3.85 | 5.80 |
| CaO | 19.80 | 7.05 | 24.75 | 7.90 | 11.00 | 8.70 | 14.70 |
| SrO | — | — | — | 12.10 | — | — | — |
| BaO | 3.60 | — | — | — | 16.80 | — | — |
| ZnO | — | 2.05 | 0.60 | 1.90 | — | 14.60 | 1.95 |
| PbO | — | — | — | — | — | — | 9.60 |
| $La_2O_3$ | 13.70 | 8.20 | 6.55 | 7.65 | — | 5.20 | — |
| $Y_2O_3$ | — | — | — | — | — | — | 3.60 |
| $Gd_2O_3$ | — | — | — | — | — | — | — |
| $Yb_2O_3$ | — | — | — | — | — | — | — |
| $TiO_2$ | 6.35 | 8.05 | 7.95 | 7.50 | 10.20 | 7.60 | 7.15 |
| ZrO | 2.90 | 7.00 | 6.10 | 5.80 | 6.00 | 5.90 | 5.80 |
| $Nb_2O_5$ | 6.15 | 6.80 | 5.95 | 6.55 | 6.60 | 6.25 | 5.75 |
| $WO_3$ | — | — | — | — | — | — | — |
| $Ta_2O_5$ | — | — | — | — | — | — | — |
| nd | 1.6991 | 1.7051 | 1.7005 | 1.7000 | 1.7075 | 1.6982 | 1.7064 |
| νd | 41.6 | 38.1 | 40.5 | 40.0 | 38.3 | 38.5 | 37.10 |
| S | 3.29 | 3.17 | 3.12 | 3.30 | 3.29 | 3.26 | 3.25 |

| | 15 | 16 | 17 | 18 | 19 | 20 | 21 |
|---|---|---|---|---|---|---|---|
| $B_2O_3$ | 7.75 | 8.10 | 11.20 | 11.60 | 11.25 | 9.80 | 11.15 |

TABLE-continued (Examples in % by Weight)

| | | | | | | | |
|---|---|---|---|---|---|---|---|
| SiO$_2$ | 28.60 | 28.25 | 25.50 | 26.00 | 24.00 | 26.45 | 25.45 |
| Al$_2$O$_3$ | — | — | — | — | — | — | — |
| GeO$_2$ | — | — | — | — | — | — | — |
| P$_2$O$_5$ | — | 3.40 | — | — | 3.10 | 2.45 | 2.50 |
| Li$_2$O | — | 1.45 | 1.45 | 1.45 | 0.70 | 0.75 | 1.50 |
| Na$_2$O | 4.45 | 3.00 | 3.00 | 3.00 | 4.50 | 3.10 | 3.15 |
| K$_2$O | 6.70 | 4.50 | 4.50 | 4.50 | 4.55 | 7.00 | 4.75 |
| MgO | 3.85 | 3.90 | 5.95 | 4.40 | 2.90 | 6.00 | 7.15 |
| CaO | 15.20 | 14.90 | 16.65 | 15.05 | 16.30 | 15.30 | 14.20 |
| SrO | — | — | — | — | — | — | — |
| BaO | — | — | — | — | — | — | — |
| ZnO | — | — | 1.00 | — | — | 2.00 | — |
| PbO | — | — | — | — | — | — | — |
| La$_2$O$_3$ | — | 16.25 | — | 7.95 | 6.60 | 8.10 | — |
| Y$_2$O$_3$ | 14.85 | — | 3.70 | — | — | — | — |
| Gd$_2$O$_3$ | — | — | 3.00 | — | — | — | — |
| Yb$_2$O$_3$ | — | — | — | — | — | — | 9.20 |
| TiO$_2$ | 7.90 | 8.70 | 3.95 | 9.75 | 10.55 | 12.90 | 11.10 |
| ZrO$_2$ | 4.40 | 3.70 | 7.60 | 6.00 | — | 6.15 | 3.10 |
| Nb$_2$O$_5$ | 6.30 | 3.85 | 12.50 | 0.60 | 2.60 | — | 6.75 |
| WO$_3$ | — | — | — | 9.70 | — | — | — |
| Ta$_2$O$_5$ | — | — | — | — | 12.85 | — | — |
| nd | 1.7044 | 1.7056 | 1.7013 | 1.6981 | 1.7005 | 11.6990 | 1.6978 |
| νd | 40.0 | 41.2 | 40.5 | 39.0 | 37.9 | 38.10 | 37.8 |
| S | 3.18 | 3.27 | 3.19 | 3.22 | 3.26 | 3.12 | 3.16 |

| | 22 | 23 | 24 | 25 |
|---|---|---|---|---|
| B$_2$O$_3$ | 6.90 | 12.65 | 11.25 | 11.40 |
| SiO$_2$ | 18.60 | 26.30 | 21.10 | 23.65 |
| Al$_2$O$_3$ | — | — | — | — |
| GeO$_2$ | — | — | 6.35 | — |
| P$_2$O$_5$ | 12.06 | 1.10 | 1.40 | — |
| Li$_2$O | 2.22 | 2.30 | 1.45 | 1.45 |
| Na$_2$O | 3.07 | — | 3.00 | 3.00 |
| K$_2$O | 2.33 | — | 4.55 | 4.60 |
| MgO | 6.99 | 6.15 | 5.90 | 6.95 |
| CaO | 15.98 | 21.35 | 15.00 | 24.50 |
| SrO | — | — | — | — |
| BaO | — | — | — | — |
| ZnO | 2.02 | 5.10 | 1.95 | — |
| PbO | — | — | — | — |
| La$_2$O$_3$ | 8.07 | 8.30 | 7.90 | 6.10 |
| Y$_2$O$_3$ | — | — | — | — |
| Gd$_2$O$_3$ | — | — | — | — |
| Ab$_2$O$_3$ | — | — | — | — |
| TiO$_2$ | 7.92 | 5.10 | 7.75 | 6.30 |
| ZrO$_2$ | 6.56 | 6.25 | 6.00 | 6.05 |
| Nb$_2$O$_5$ | 6.45 | 5.40 | 6.40 | 6.00 |
| WO$_3$ | — | — | — | — |
| Ta$_2$O$_5$ | — | — | — | — |
| SnO | 0.50 | | | |
| nd | 1.7049 | 1.7052 | 1.7048 | 1.6995 |
| νd | 39.2 | 42.1 | 39.1 | 41.0 |
| S | 3.17 | 3.13 | 3.27 | 3.15 |

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical ophthalmic glass having an index of refraction of $\geq 1.69$, an Abbe number of $\geq 37$, and a density of $\leq 3.30$ g/cm$^3$, consisting essentially of (in % by weight):

| | |
|---|---|
| SiO$_2$ | 18–36 |
| B$_2$O$_3$ | 3–18 |
| GeO$_2$ | 0–8 |
| Al$_2$O$_3$ | 0–6, |
| wherein SiO$_2$ + B$_2$O$_3$ + Al$_2$O$_3$ + GeO$_2$ = | 25–39 |
| P$_2$O$_5$ | 0–14, |
| wherein SiO$_2$ + B$_2$O$_3$ + Al$_2$O$_3$ + GeO$_2$ + P$_2$O$_5$ = | 30–44 |
| Li$_2$O | 0–12 |
| Na$_2$O | 0–14 |
| K$_2$O | 0–18 |
| Li$_2$O + Na$_2$O + K$_2$O = | 2–18 |
| MgO | 0–15 |
| CaO | 7–21.35 |
| MgO + CaO | 15–32 |
| SrO | 0–13 |
| BaO | 0–17 |
| ZnO | 0–15 |
| PbO | 0–10 |
| SrO + BaO + ZnO + PbO | 0–20 |
| TiO$_2$ | 3.95–14 |
| Nb$_2$O$_5$ | 0–13 |
| WO$_3$ | 0–10 |
| TiO$_2$ + Nb$_2$O$_5$ + WO$_3$ = | 10–21 |
| ZrO$_2$ | 2.9–15, |
| La$_2$O$_3$ | 0–20 |
| Y$_2$O$_3$ | 0–16 |
| Gd$_2$O$_3$ | 0–16 |

-continued

| | |
|---|---|
| $Yb_2O_3$ | 0–10 |
| $La_2O_3 + Y_2O_3 + Gd_2O_3 + Yb_2O_3 =$ | 0–20 |
| $Ta_2O_5$ | 0–13 |
| $HfO_2$ | 0–6 |
| $SnO_2$ | 0–6. |

2. An optical and ophthalmic glass of claim 1 having an Abbe number of $\geq 39$ and a density of $\leq 3.2$ g/cm$^3$, which is sufficiently stable with respect to crystallization to permit continuous manufacture, and which is acid resistant and resistant to climatic changes, consisting essentially of (% by weight):

| | |
|---|---|
| $B_2O_3$ | 5–14 |
| $SiO_2$ | 24–32 |
| $Al_2O_3$ | 0–6 |
| $GeO_2$ | 0–8 |
| $B_2O_3 + SiO_2 + Al_2O_3 + GeO_2 =$ | 33–39 |
| $P_2O_5$ | 0–6 |
| $B_2O_3 + SiO_2 + Al_2O_3 + GeO_2 + P_2O_5 =$ | 37–43 |
| $Li_2O$ | 0–7 |
| $Na_2O$ | 0–8 |
| $K_2O$ | 0–11 |
| $Li_2O + Na_2O + K_2O =$ | 4–14 |
| $MgO$ | 0–10 |
| $CaO$ | 12–21.35 |
| $MgO + CaO =$ | 18–27 |
| $ZnO$ | 0–8 |
| $BaO$ | 0–6 |
| $SrO$ | 0–5 |
| $PbO$ | 0–5 |
| $ZnO + BaO + SrO + PbO =$ | 0–8 |
| $TiO_2$ | 6–10 |
| $Nb_2O_5$ | 0–8 |
| $WO_3$ | 0–10 |
| $TiO_2 + Nb_2O_5 + WO_3 =$ | 13–19 |
| $ZrO_2$ | 3–9 |
| $La_2O_3$ | 0–11 |
| $Y_2O_3$ | 0–12 |
| $Gd_2O_3$ | 0–8 |
| $Yb_2O_3$ | 0–7 |
| $La_2O_3 + Y_2O_3 + Gd_2O_3 + Yb_2O_3 =$ | 0–14 |
| $Ta_2O$ | 0–7 |
| $HfO_2$ | 0–6 |
| $SnO_2$ | 0–6 |

3. A glass of claim 1 wherein the amount of $TiO_2$ is 6–10%.

4. A glass of claim 1 wherein 0–1% of the oxygen ions are replaced by fluoride ions.

5. A lens made of glass of claim 1 or 2.

6. A lens of claim 5 for eyeglasses.

7. A glass of claim 1 wherein the amount of $TiO_2$ is 6–14%.

8. A glass of claim 1 wherein the amount of $TiO_2$ is 3.95–10%.

9. A glass of claim 1 wherein the amount of $ZrO_2$ is 3–8%.

10. A glass of claim 3 wherein the amount of $ZrO_2$ is 3–8%.

11. A glass of claim 7 wherein the amount of $ZrO_2$ is 3–8%.

12. A glass of claim 1 wherein the amount of $ZrO_2$ is 3–15%.

13. A glass of claim 3 wherein the amount of $ZrO_2$ is 3–15%.

14. A glass of claim 7 wherein the amount of $ZrO_2$ is 3–15%.

* * * * *

UNITED STATES PATENT AND TRADEMARK OFFICE
CERTIFICATE OF CORRECTION

PATENT NO. : 4,390,638
DATED : June 28, 1983
INVENTOR(S) : KARL MENNEMANN ET AL

It is certified that error appears in the above-identified patent and that said Letters Patent is hereby corrected as shown below:

Column 10, lines 9 and 10: Reads "$Ta_2O$  0-7
$HfO_2$  0-6"

Should read -- $Ta_2O_5$  0-7
$HfO_2$  0-5 --

Signed and Sealed this

Thirteenth Day of September 1983

[SEAL]

Attest:

GERALD J. MOSSINGHOFF

*Attesting Officer*   *Commissioner of Patents and Trademarks*